United States Patent [19]

Sunagawa

[11] 4,065,968
[45] Jan. 3, 1978

[54] LIQUID LEVEL MEASURING APPARATUS
[75] Inventor: Yoshihiko Sunagawa, Kanagawa, Japan
[73] Assignee: Tokyo Keiso Kabushiki Kaisha, Tokyo, Japan
[21] Appl. No.: 755,395
[22] Filed: Dec. 29, 1976
[30] Foreign Application Priority Data
Dec. 30, 1975 Japan .................. 50-159543
[51] Int. Cl.$^2$ ............................ G01F 23/12
[52] U.S. Cl. ........................ 73/313; 73/321
[58] Field of Search ............ 73/313, 308, 321; 340/236

[56] References Cited
U.S. PATENT DOCUMENTS
3,969,941  7/1976  Rapp ........................... 73/321

FOREIGN PATENT DOCUMENTS
44-6357  12/1969  Japan ........................ 73/313

Primary Examiner—Donald O. Woodiel
Attorney, Agent, or Firm—Fred Philpitt

[57] ABSTRACT

A liquid level measuring apparatus consisting of a mechanism to convert the change in the liquid level into a rotational movement, a scanning apparatus to successively scan the magnetic-field generating electric conductors provided on a disc by means of a magneto-sensitive head caused to rotate by said mechanism, an electronic circuit to produce measured figures of said electric conductors scanned by said scanning apparatus as pulse signals, and a digital indicator caused to be operated by means of said signals produced by said electronic circuit.

3 Claims, 5 Drawing Figures

LIQUID LEVEL MEASURING APPARATUS

The present invention relates to a liquid level measuring apparatus.

A principal object of the present invention is to provide an apparatus by which a liquid level can be indicated numerically.

A further object of the present invention is to provide a system in which the change in the liquid level is converted into a rotational momentum by means of a tape suspending a displacer and a sprocket wheel which is in engagement with perforations of the tape.

A further object of the present invention is to provide a system in which electric conductors provided on the periphery of an insulating disc can be scanned by a magneto-sensitive head provided on an arm which is to be rotated responsive to the change in the liquid level.

A further object of the present invention is to provide a system in which a current is successively passed to said electric conductors of said disc through a pulse current output circuit.

A further object of the present invention is to provide a system in which the number of electric conductors scanned by said magneto-sensitive head is converted into a number of pulse signals to be indicated through a digital indicator.

A further object of the present invention is to provide a simple system which, due to the utilization of a logic circuit, does not require the use of complicated mechanical construction such as an intermittent gear mechanism.

The nature of the present invention will become more fully apparent from a consideration of the following description of exemplary embodiments thereof, taken in conjunction with the accompanying drawings, in which.

Figure 4:
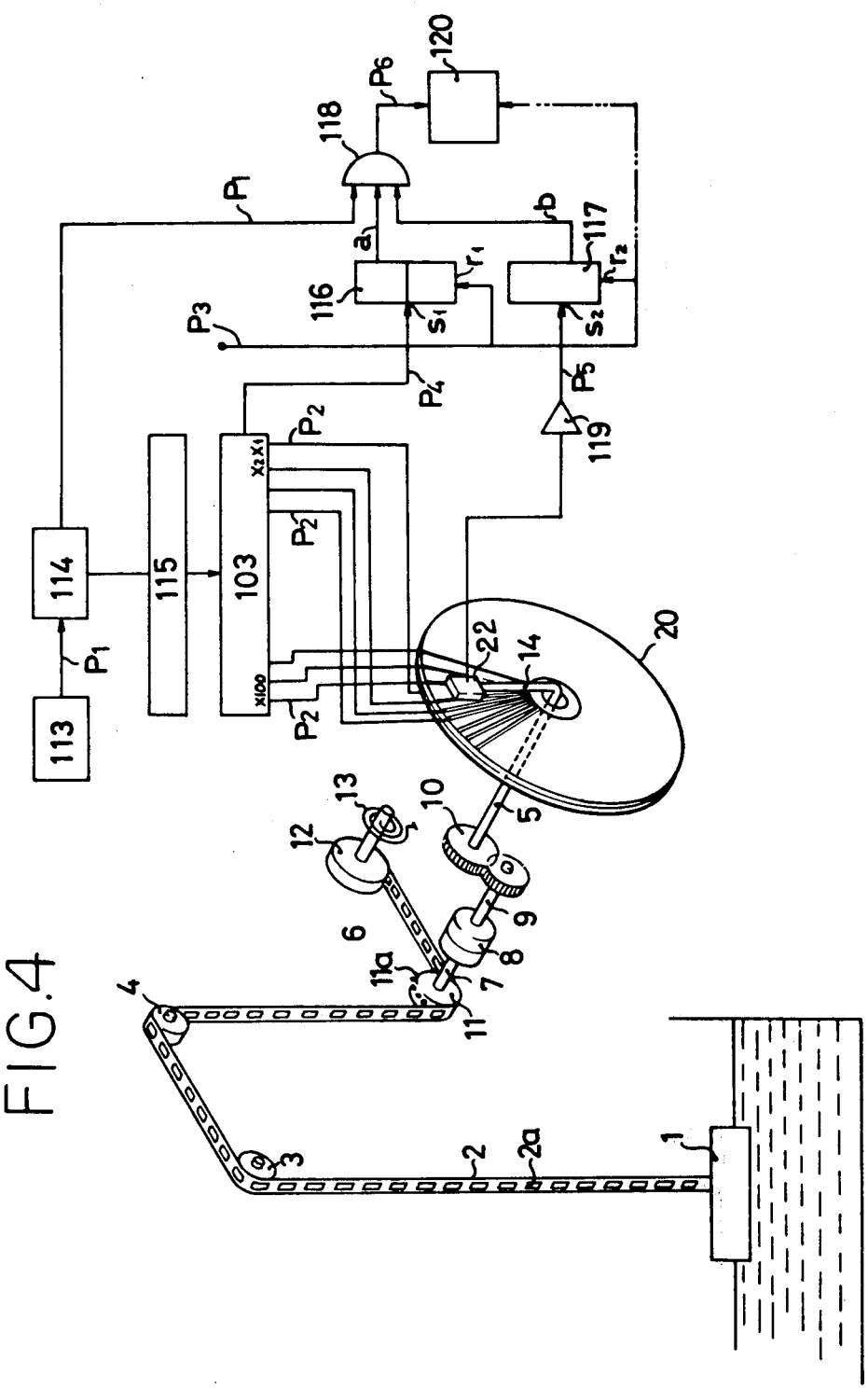
FIG. 4 is a generic view of another embodiment of the present invention in which single scanning apparatus is provided.

In FIG. 4, reference numeral 1 designates a displacer which could, for instance, be a liquid-level detecting member. Reference numeral 2 designates a tape which suspends the displacer 1 toward the liquid level, the tape being provided with uniformly spaced perforations 2a. The tape 2 is arranged to be wound up, via guide pulleys 3 and 4, by a winder 12 of a winding mechanism generally designated by a reference numeral 6. The winder 12 is placed under the control of a spring 13 so as to apply thereto rotational force to roll up the tape 2, whereby proper tension may constantly be given to the tape 2 in the case where the tension of the tape 2 varies due to the movement of the displacer 1 responsive to the change in the liquid level.

The winding mechanism 6 further comprises a sprocket wheel 11 adapted to convert the moved quantity of the tape into the rotation quantity. Pawls 11a provided on the outer periphery of the sprocket wheel 11 are in engagement with perforations 2a of the tape 2 so that the sprocket wheel 11 may be caused to rotate in response to the movement of the tape 2. Rotational motion of a sprocket wheel shaft which is designated by reference numeral 7 will be transmitted, via a clutch 8, to an input shaft 9 of a reduction gear 10. Reference numeral 5 designates an output shaft of the reduction gear 10.

Designated generally by reference numeral 20 is a stationary disc made of insulating materials. Radially arranged on one side of the stationary disc 20 are one hundred electric conductors Y1, Y2 ... Y100 which are to generate magnetic field and which are collectively earthed.

As will be understood from the drawings, there is made a hole in the center of the stationary disc 20 through which the output shaft 5 of the reduction gear 10 is made to pass. The output shaft 5 has at its tip portion a scanning arm 14 which is positioned at a right angle with respect to the output shaft 5. The tip portion of the scanning arm 14 is provided with a magnetic head 22. Accordingly, it will be noted that as the output shaft rotates in proportion to the change in the liquid level, so the magnetic head 22 moves to scan the electric conductors on the stationary disc 20.

Designated by reference numeral 113 is a pulse generator. Pulse signal P1 generated from the pulse generator 113 will operate a counter 114 consisting of a flip-flop circuit whilst a signal from the counter 114 will operate a decoder 115. Then, one hundred transistor switches (not shown) in an output circuit 103 will individually, consecutively and instantly be turned ON to pass pulse current P2 from the output circuit 103 to the electric conductors Y1, Y2 ... Y100 provided on the disc 20 (see FIG. 5), whereby a magnetic field will successively be provided around each of the electric conductors Y1, Y2 ... Y100. In this connection, it is to be noted that passing of current to all of the electric conductors Y1 . . . Y100 is arranged to be completed within the time required for the magnetic head 22 moves from the electric conductor Y$n$ to the next electric conductor Y$n+1$. Actually, the time required for scanning all of the electric conductors will be 0.1 millisecond.

Designated by a reference numeral 116 is a flip-flop having an input terminal S1. This input terminal S1 is designed to be in electrical contact with the basic electric conductor Y1 and is designed to receive a start pulse P4 generated from the output circuit 103. An output signal a from the flip-flop 116 will be received by an "and" gate 118.

Designated by a reference numeral 117 is another flip-flop having an input terminal S2. This input terminal S2 is designed to receive a stop pulse signal P5 which was detected by the magnetic head 22 and was amplified by an amplifier 119. An output signal b appears at the output terminal of the flip-flop 117 will be received by one of the input terminals of the "and" gate 118. Then the reset pulse P3 will be fed to each of the reset terminals r1, r2 of the flip-flops 116, 117.

Each of the input terminals of the "and" gate 118 is designed to receive the output signals a,b of the flip-flops 116, 117 and also to receive a pulse signal P1 from the monomultivibrator. Connected to the output terminal of the "and" gate 118 is a digital indicator 120 which is to calculate the number of the pulse and to represent them in number. This indicator 120 can be cleared by the reset pulse signal P3.

According to the apparatus of the present invention specifically explained above, when the reset pulse signal P3 is fed to the reset terminals r1, r2 of the flip-flops 116, 117, the output signal a of the flip-flop 116 becomes a logic 0 whilst the output signal b of the flip-flop 117 becomes a logic 1. Accordingly, the "and" gate 118 to which the pulse signal P1 of the monomultivibrator 113 as well as the output signals a,b of the flip-flops 116, 117 are fed will be closed and the pulse signal P1 does not appear at the output terminal of the "and" gate 118.

Further, a magnetic field will be provided around the electric conductor Y1 of the stationary disc 20, due to the pulse current P2 from the output circuit 113. Concurrently therewith, the start pulse P4 will be fed from the output circuit 113 to the flip-flop 116, whereby the flip-flop 116 will be inverted, the output a becomes 1, the "and" gate 118 will be opened and the pulse signal P1 appears at the output terminal of the "and" gate 118.

Assuming that the magnetic head 22 is brought into contact with the fifth electric conductor Y5, the first electric conductor being Y1, by the rotation of the rotary shaft 5, a magnetic field will be provided around the electric conductor Y5. This magnetic field will then be detected by the magnetic head 22 and the stop pulse signal P5 appears at the output terminal of the amplifier 119 which is connected to the magnetic head 22. This stop pulse signal P5 will be fed to the flip-flop 117, which flip-flop will then be inverted and the output signal b becomes O, whereby the "and" gate 118 will be closed and the pulse signal P1 does not appear at the output terminal thereof.

Figure 5:
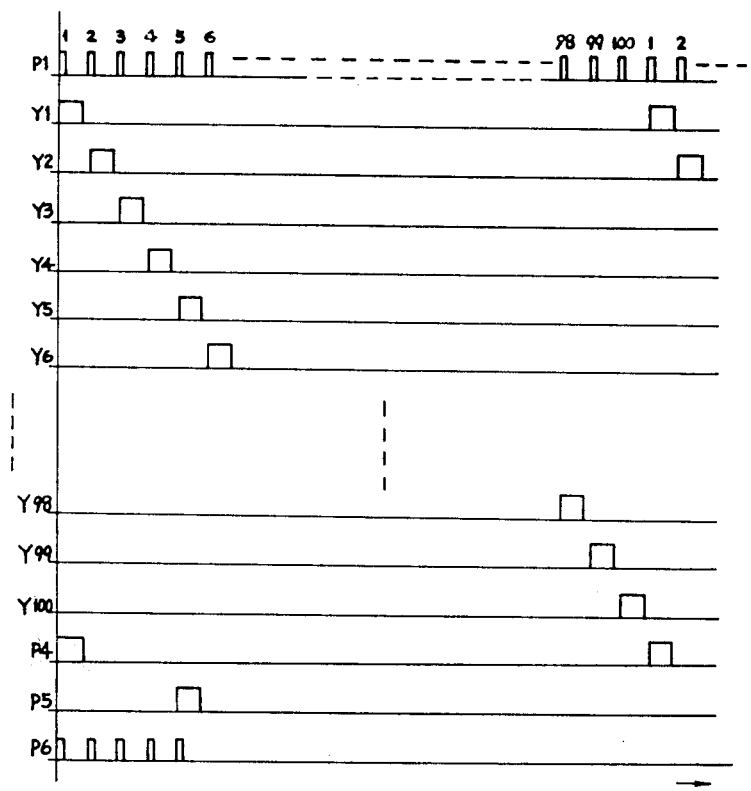
FIG. 5 is a time chart of a signal.

Accordingly, the output pulse signal P6 of the "and" gate 118 conforms with the number of times through which the electric current is made to pass from the electric conductor Y1 to the electric conductor Y5 i.e. five times, and this output pulse signal P6 will be fed to the digital indicator 120 to represent directly the angle between the electric conductors Y1 and Y5 by means of a pulse number (see FIG. 5).

Similarly, in the case where the magnetic head 22 is brought into contact with the electric conductor $Yn$ which takes $n$ position, $n$ being the number counted from the the electric conductor Y1, the output pulse signal P6 conforms with the number of times through which the electric current is made to pass from the electric conductor Y1 to the electric conductor $Yn$ i.e. $n$ times, whereby the number corresponding to $n$ times will be represented digitally by the digital indicator 120.

When it becomes necessary to make further measurement, the reset pulse signal P3 will initially be added to the flip-flop 116, 117 so that the output signal a of the flip-flop 116 becomes 0 and the output signal b of the flip-flop 117 becomes 1, thereafter similar operation as above-mentioned will be resumed.

As explained above, it is possible by the use of the apparatus according to the present invention to directly and digitally represent the liquid level or turned angle between the electric conductors Y1 and Y100 provided on the stationary disc 20.

Since the electric conductors Y1 . . . Y100 are designed to provide the magnetic field responsive to the electric current applied thereto and the arrangement is made to detect such magnetic field by the magnetic head, it is not only possible to reduce them to an electronic circuit but also possible to logicalize them in accordance with the binary notation. Other advantages reside in that the apparatus according to the present invention does not require the known complicated mechanical switch arrangement which is liable to be put out of order, nor does it require the use of the expensive digital counter which utilizes the intermittent gear.

Figure 1:
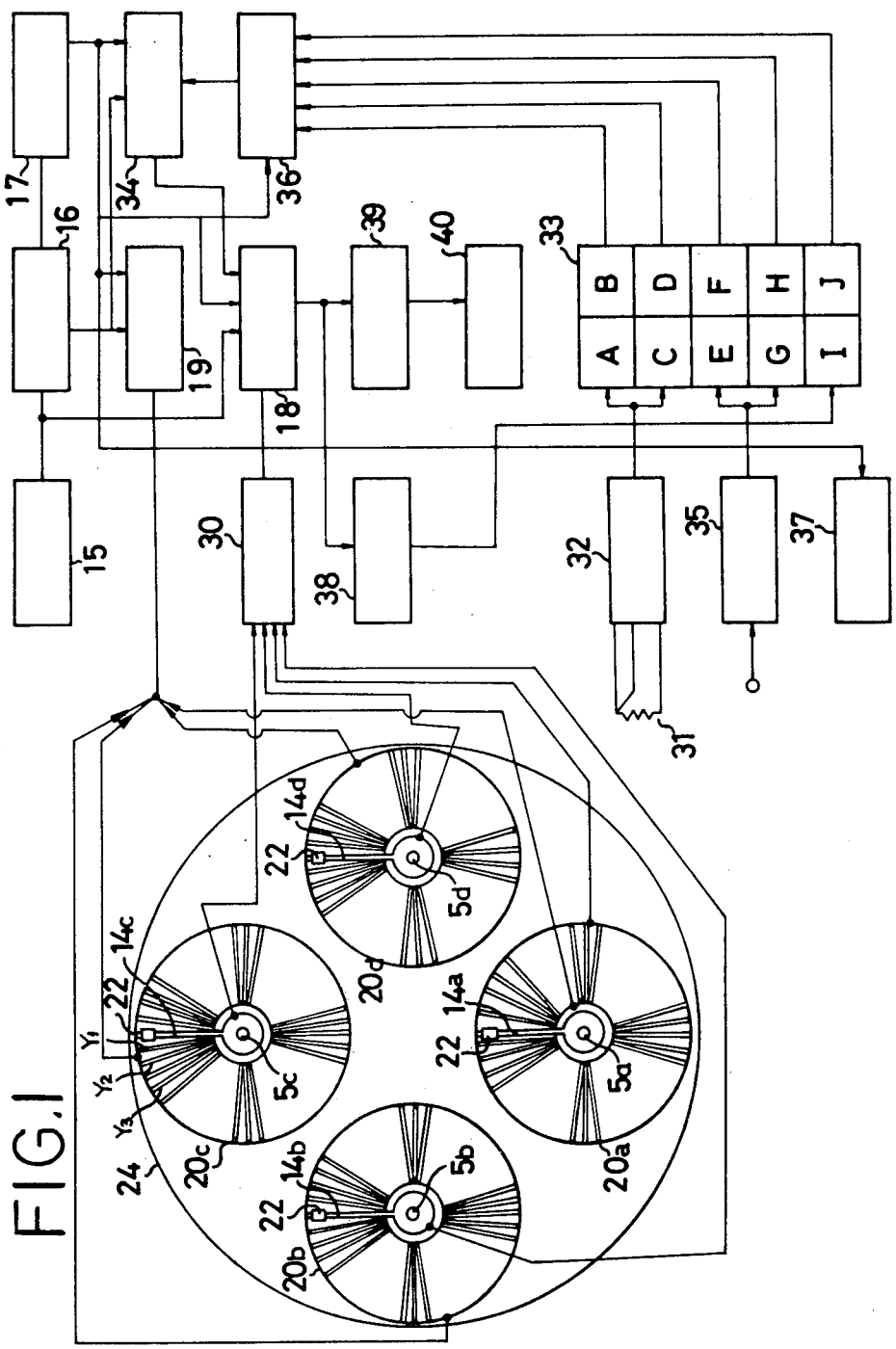
FIG. 1 is a generic view of one embodiment of the present invention in which a plurality of scanning apparatus are provided.
Figure 2:
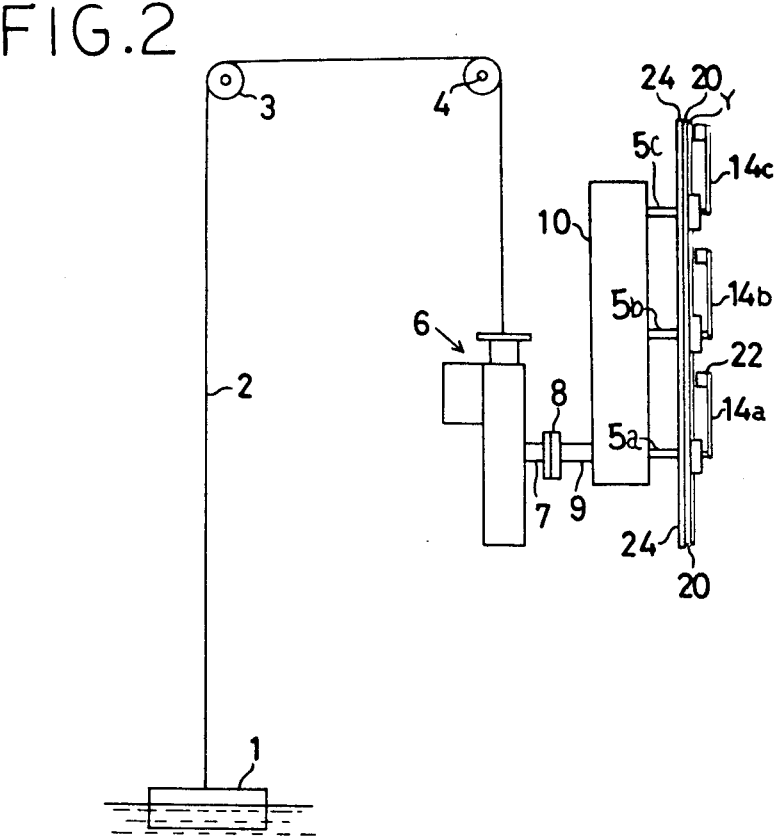
FIG. 2 is a side view thereof.

FIGS. 1 and 2 show another embodiment according to the present invention, in which four stationary discs 20a, 20b, 20c and 20d are provided on a basic plate 24. In this embodiment, four output shafts 5a, 5b, 5c, 5d are provided with respect to the reduction gear 10 in such a manner that each of the shafts passes through each center of the stationary discs 20a, 20b, 20c and 20d. The rotation speed of each of the output shafts 5a, 5b, 5c, 5d is set to the ratio of 1:1/10:1/100:1/1000. Electronic circuit in this embodiment will be explained as follows.

In FIG. 1, reference numeral 15 designates a clock pulse oscillating circuit, 16 a counter. The counter 16 is capable of calculating the clock pulse from the oscillating circuit 15 and generating one pulse per one lap (100 pulses/cycle, for instance). Reference numeral 17 designates a programming counter which is designed to generate a marking pulse on the basis of the output pulse from the counter 16 and also to provide a space for a gate circuit 18 in order that the digital data may successively be transmitted through the time sharing system. The marking pulse behaves to be a start signal for transmission of a series of signals. The marking pulse is of one hundred times pulse recurrence intervals in comparison, for instance, with the data pulse. Accordingly, it can be easily distinguished from the data pulse. The space will necessarily be in existence between the data and behaves to show termination of each data transmission. This space is also of one hundred times pulse recurrence intervals as much as that of the data pulse and, thus, it can be easily be distinguished from the data pulse.

The sequence of the space which comes after the mark pulse will be evaluated by the receiving side to distinguish the sense or meaning of the data signal, from which it follows that no synchronizing arrangement between the transmitting side and the receiving side is necessary.

Reference numeral 19 designates a displacement scanning circuit, which is to add sequentially the pulses from the counter 16 to the electric conductors Y1, Y2 . . . Y100 in response to the command signal from the programming counter 17, and thereby to scan the displacement angle of the arms 14a through 14d. The gate circuit designated by reference numeral 18 is, in response to the command signal and the process variate measuring signal from the programming counter 17, to allow the clock pulse of the oscillator 15 to pass within the time proportional to the process variate measuring value and to provide the space in response to the command from the programming counter 17. Designated by reference numeral 30 is a pre-amplifier.

Reference numeral 31 designates a resistor for measuring the temperature and 32 a temperature measuring circuit. The temperature measuring circuit 32 consists of a bridge circuit which forms a counterpart to the temperature measuring resistor 31 and an A-D converter which will amplify the deviation output of the bridge circuit and convert the analog quantity thereof into the digital quantity. The output of the temperature measuring circuit 32 will be integrated by a data integrated circuit 33. In the case of the data being of four figures, the first figure will be A, the second FIG. B, the third FIG. C and the fourth FIG. D. The third and fourth stages of the data integrated circuit 33 are capable of accepting the external input via the input circuit 35.

Reference numeral 36 designates a data selective circuit, 34 a digital comparator, and 37 a control signal output circuit which is designed to transmit the command signal from the programming counter 17 to other meter such as a pressure gauge. Reference numeral 38 designates a parity generating circuit for deciding if the total number of the pulses provided through the gate circuit 18 is odd or even. The data of the parity generating circuit 38 will be transmitted to the fifth stage I of the data integrated circuit 33, in which the code is 1 if the total number of pulses is odd whilst the code is 2 if the total number of pulses is even. These pulses will be detected by the receiving side.

The function of the digital data transmission apparatus of the construction as above mentioned will be explained as follows.

Figure 3:
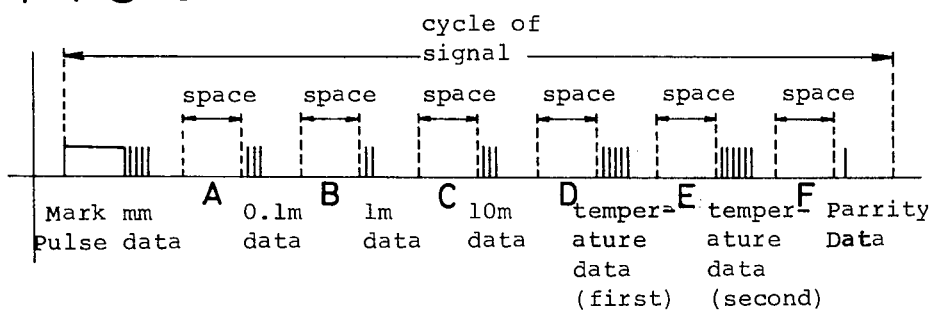
FIG. 3 is a cycle diagram of a signal.

In the first place, digital convertion of the liquid level and transmission thereof will be explained.

when the counted value of the counter which counts the clock pulse of the oscillator 15 amounts to the value of one circle (or 100 pulses), the pulse to advance the program by one step will be fed to the programming counter 17 which counter will then provide a mark pulse. This mark pulse will be added to the gate circuit 18 to open the gate thereof. Accordingly, the clock pulse from the oscillator 15 will be added to the modulation circuit 39 and transmitted to the receiving side through the power/output circuit 40. In the meantime, the mark pulse of the programming counter 17 will simultaneously be added to the displacement scanning circuit 19 by which the displacement angle of the arm 14a with minimum figure will firstly be scanned. That is, the electric conductors provided radially on the disc will be subjected to the electric current one by one starting from the basic electric conductor. The switching circle from one electric conductor to the next one will be the hundredth (1/100) of the mark pulse. When the electric current is fed to the electric conductors, the magnetic field will be provided around them (see FIG. 3). Accordingly, when the electric current is applied to the electric conductor corresponding to the magnetic head 22 of each arm 14a, the magnetic field will be provided. This magnetic field will be detected by the magnetic head 22. Detected signal will then be inputted to the pre-amplifier 30 to amplify the same. Amplified signal will be inputted to the gate circuit 18 to close the gate. In this instance, it will be appreciated that the gate circuit 18 has allowed the clock pulse of the oscillator 15 to pass therethrough during the time when the electric current is being passed from the basic electric conductor to the electric conductor corresponding to the magnetic head 22 of the arm 14a. In this embodiment, number of the electric conductors provided on the stationary disc amounts to 100 and, since the scanning cycle corresponds to the clock pulse of the oscillator 15, the displacement of the arm 14a with respect to the basic electric conductor will be indicated by the ratio of the pulse number n which passed through the gate with a speed of 100 per one cycle i.e. by n/100 rotation. The signal will be indicated by mm data (see FIG. 3).

When the counter 16 further proceeds with counting the clock pulse of the oscillator 15 and the number reaches full count (100 count in this case), the programming counter 17 will be advanced by 1 step in order to command the gate circuit 18 to generate a space. Then, the gate will intercept the transit of the clock pulse from the oscillator 15 during the next one cycle (100 pulse) of the counter 16, whereby space A will be provided.

When the space A passes, the programming counter 17 will be caused to advance 1 step by the input pulse of the counter 16 and the gate circuit 18 will be opened. Simultaneously therewith, the displacement angle scanning command of the arm 14a will be fed to the displacement scanning circuit 19. The electric conductors on the disc 20b will then be energized one by one and the displacement angle will be detected by the magnetic head 22. Until the gate circuit 18 is closed by the detected signal, the clock pulse from the oscillator 15 will continuously be fed. This clock pulse will be transmitted as 0.1 m data via the modulation circuit 39 and the power/output circuit 40. The displacement angle scanning operation of the arm 14c 14d will be carried out in the same manner and 1m and 10m digital data will be transmitted.

The receiving side will distinguish the quantity of the digital counted, by way of referring to the sequence of the space coming after the mark pulse, and will get to know the amount of displacement of the arms 14a, 14b, 14c, 14d, each being with reduction rate of 1:1/10:1/100:1/1000 respectively, in order to read the total amount of displacement.

Reference will now be made to the temperature data transmission.

When the scanning by the arm 14d is finished, the programming counter 17 will command the gate circuit 18 to generate space D, during which the gate circuit 18 is closed. When the counter 16 counts the next one cycle pulse (100 pulse), the program of the programming counter 17 is caused to advance by one step, the gate circuit 18 is opened and the clock pulse of the oscillator 15 is allowed to pass. Simultaneously therewith, the temperature measurement command will be given to the data selective circuit 36 from the programming counter 17. The data A,B in the first stage of the data integrated circuit 33 will be fed to the data selective circuit 36 and the output therefrom will be fed to the digital comparator 34. In case of this data coincides with the data corresponding to the counted pulse from the counter 16, the digital comparator 34 will proceed with transmitting a signal to the gate circuit 18 to close the gate. As a result thereof, the temperature data of one figure and two figure will be transmitted from the power/output circuit 40 via the modulation circuit 39. When the counter 16 takes full count, data transmission will not be made, for the programming counter 17 causes the gate circuit 18 to generate space E. In case of the counter 16 taking another full count, the data of three figure and four figure will be transmitted as in the case of A, B in the first stage. Similar data transmission will be effected in case of an external output being fed via the input circuit 35. After these data and the space E, F has been generated, the signal in the fifth stage of the data integrated circuit 33 will be transmitted to the digital comparator 34 via the data selective circuit 36. If the total number of the pulse passed through the gate circuit 18 is odd, parity data to be transmitted will be one pulse and if it is even the parity data will be two pulse. Generation of this parity data means that all of the cycle of data transmission has been completed. The programming counter 17 returns to its original state and, hereafter, similar operation will be resumed.

While the particular embodiment of the present invention has been shown and described, it will be obvious to those skilled in the art that changes and modifications may be made without departing from the invention in its broader aspects and, therefore, the aim in the appended claims is to cover all such changes and modifications as fall within the true spirit and scope of this invention.

What is claimed is:

1. A liquid level measuring apparatus comprising:
   a. a mechanism to convert the change in the liquid level into the rotational movement;
   b. an insulating stationary disc, through the center of which a rotary output shaft of said mechanism extends, a large number of electric conductors designed to provide a magnetic field on being energized being provided radially on one side of said disc;
   c. a magneto-sensitive head, provided on an arm which forms a part of said rotary output shaft and adapted to rotate together with said rotary output shaft in parallel with said electric conductors provided on said disc in order to detect the magnetic field provided by said electric conductors and to generate a stop pulse;
   d. a circuit designed to put out a total number of energization of said electric conductors, the total number corresponding to the number of electric current pulses necessary for consecutively providing the magnetic field during the time commencing with the stage when a start pulse is generated simultaneously with the generation of the magnetic field from the basic electric conductor and ending with the stage when said stop pulse is generated, as a pulse signal; and
   e. a digital indicator to be operated by said pulse signal.

2. A liquid level measuring apparatus comprising:
   a. a mechanism to convert the change in the liquid level into the rotational movement;
   b. an insulating stationary disc, through the center of which a rotary output shaft of said mechanism extends, a large number of electric conductors designed to provide a magnetic field on being energized being provided radially on one side of said disc;
   c. a magneto-sensitive head, provided on an arm which forms a part of said rotary output shaft and adapted to rotate together with said rotary output shaft in parallel with said electric conductors provided on said disc in order to detect the magnetic field provided by said electric conductors and to generate a stop pulse;
   d. a pulse current output circuit (103) adapted to consecutively apply the electric current to said electric conductors of said disc on receiving a clock pulse signal (P1) from a clock pulse generator;
   e. a flip-flop circuit (116) to which a reset pulse (P3) and a start pulse (P4) which is in synchronized relation with the energization of said basic electric conductor are applied;
   f. a flip-flop circuit (117) to which a reset pulse (P3) and a stop pulse (P5) from said magneto-sensitive head are applied;
   g. an "and" gate circuit (118) to which said clock pulse (P1) and outputs $a$, $b$ each from said flip-flop circuits (116), (117) are applied; and
   h. a digital indicator (170) to be operated by the output from the "and" gate.

3. A liquid level measuring apparatus comprising:
   a. a mechanism to convert the change in the liquid level into the rotational movement;
   b. an insulating stationary disc, through the center of which a rotary output shaft of said mechanism extends, a large number of electric conductors designed to provide a magnetic field on being energized being provided radially on one side of said disc;
   c. a magneto-sensitive head, provided on an arm which forms a part of said rotary output shaft and adapted to rotate together with said rotary output shaft in parallel with said electric conductors provided on said disc in order to detect the magnetic field provided by said electric conductors and to generate a stop pulse;
   d. a clock pulse generator (113) and a counter circuit (114) to which a signal from said clock pulse is appled;
   e. a decoder (115) to be operated by a signal from said counter circuit;
   f. a pulse current output circuit (103) adapted to consecutively energize the electric conductors one by one provided on said disc on receipt of a signal from said decoder;
   g. a flip-flop circuit (116) to which a reset pulse (P3) and a start pulse (P4) which is in synchronized relation with the energization of said basic electric conductor are applied;
   h. a flip-flop circuit (117) to which a reset pulse (P3) and a stop pulse (P5) from said magneto-sensitive head are applied;
   i. an "and" gate circuit to which outputs $a,b$ each from said flip-flop circuits (116), (117) are applied; and
   j. a digital indicator to be operated on receipt of an output from said "and" gate circuit.

* * * * *